(12) United States Patent
Asaka et al.

(10) Patent No.: US 6,709,786 B2
(45) Date of Patent: Mar. 23, 2004

(54) CELL MODULE STRUCTURE

(75) Inventors: Satoru Asaka, Wako (JP); Kenji Matsumoto, Wako (JP); Toshiyuki Matsuoka, Wako (JP); Koichi Yamamoto, Wako (JP); Osamu Hasegawa, Wako (JP); Mitsuru Ikeo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 290 days.

(21) Appl. No.: 09/882,356

(22) Filed: Jun. 18, 2001

(65) Prior Publication Data
US 2002/0022178 A1 Feb. 21, 2002

(30) Foreign Application Priority Data
Jun. 20, 2000 (JP) .................................... 2000-184337

(51) Int. Cl.⁷ .............................. H01M 2/22; H01M 6/44
(52) U.S. Cl. .................... 429/158; 429/159; 429/178
(58) Field of Search ................................. 429/158, 159, 429/178; 439/500

(56) References Cited

U.S. PATENT DOCUMENTS 5,578,392 A * 11/1996 Kawamura .............. 429/159 X
2002/0006544 A1 * 1/2002 Asaka et al. ................... 429/99

* cited by examiner

Primary Examiner—John S. Maples
(74) Attorney, Agent, or Firm—Armstrong, Kratz, Quintos, Hanson & Brooks, LLP

(57) ABSTRACT

A cell module structure comprises a bus bar plate and plural cylindrical cells. The bus bar plate including plural bus bars each having a positive bus bar terminal, a negative bus bar terminal, and a screw formed in one of the terminals, the bus bars being serially connected to each other with the positive bus bar terminal corresponding to the negative bus bar terminal; and a control substrate integrally provided to the bus bar and connected to the bus bars. The cell includes a positive cell terminal and a negative cell terminal coaxially aligned at an end thereof, and a screw formed in the terminal having the same polarity as that of the bus bar terminal which is formed with the screw to which the above screw is screwed. The screw of the cell is screwed to the screw of the bus bar, so that different terminals with no screw are brought into contact with each other, whereby the plural cells are serially connected.

7 Claims, 8 Drawing Sheets

CELL MODULE STRUCTURE

BACKGROUND OF THE INVENTION

1. Technical Field

The present invention relates to cell module structures equipped in electric cars, hybrid electric cars, and the like, as a driving power supply. The cell modules in the invention include any type of charging element device, including cells such as nickel hydrogen batteries and lithium batteries; and energy storage devices such as double layered capacitors (ultra-capacitors).

2. Background Art

As a cell module in which plural cells are serially connected to each other, a conventional one is exemplified in which plural cylindrical or rectangular cells having a positive terminal and a negative terminal arranged at an end thereof are arranged in parallel, and the positive terminal and the negative terminal in adjoining cells are connected to each other via a bus bar so that the cells are connected to each other. The bus bar is generally mounted to the terminals by bolts or nuts in the assembly of the cell module.

FIG. 11 shows an example of a cell 200 and a bus bar 210 for a conventional cell module. In the example, a positive terminal 201 and a negative terminal 202 are arranged and project at an end of a cylindrical cell 200. The bus bar 210 consists of a positive bus bar 211 and a negative bus bar 212, which are insulated from each other and are penetrated by bolts 220 and 220, which are screwed to the positive terminal 201 and the negative terminal 202 so as to secure and serially connect them to each other.

In such a cell module, it is indispensable to monitor the conditions such as voltage and temperature of cells for safe and effective operations thereof. Therefore, a substrate equipped with a controlling circuit for the monitor is connected to the cells, and the power for the cells is transmitted to the substrate. An elastic conductive member such as a harness is usually used for connecting the cells and the substrate.

In the conventional cell module in which plural cells are serially connected to each other according to the connecting feature in FIG. 11, the task in which the bus bar is positioned with respect to the terminal and then the bolt is secured thereto must be repeated, so that the labor for connecting the terminals by a bus bar is substantial, and the number of parts is increased, and this results in increase of the weight. Furthermore, a large space for operating a securing tool is required for securing the bolts, and care to avoid short circuiting by the tool is necessary, and the connecting working is therefore further complicated.

In order to reduce the contact resistance in the connecting portion, the terminal and the bus bar must be rigidly secured. However, the load exerted on the connecting portion increases due to deformation thereof due to vibration and temperature changes, and the condition of the connection may therefore be deteriorated. In order to reduce the load exerted on the connecting portion, it has been proposed that the cells be supported by holding members. However, this proposal results in increase in the number of parts and complication of the structure.

In general, the area occupied by overall the cell and the cell module is readily large in the cell in which a positive terminal and a negative terminal are arranged at an end thereof, and this feature is disadvantageous for vehicles which are required to effectively utilize limited space.

It has been proposed to change the shapes of the positive terminal and the negative terminal to avoid misassembly in which the positive terminals are connected or negative terminals are connected. However, since the terminals are usually formed as protrusions, misassembly cannot be completely avoided. In addition, since the terminals are formed as protrusions, the terminals are often damaged by mishandling thereof. As a result, sufficient electrical contact cannot be obtained, or the terminals may short circuit in some cases.

In the connecting feature in which a control substrate is connected to cells by a harness, the current transmitted from the cells to the substrate is restricted by the resistance in the harness. Therefore, it is necessary to choose a harness having as a low resistance as possible. As a harness having low resistance, a harness with a short length, with a large cross section, or made from low resistance materials, may be mentioned. When the low resistance is achieved by the short length or the large cross section, arrangement of the harness may be difficult, and the position for locating the substrate may be restricted. In the cell modules in which plural cells are serially connected to each other, each cell must be connected to a harness, so that the task for connecting and the structure may be disadvantageously complicated.

SUMMARY OF THE INVENTION

Therefore, an object of the present invention is to provide cell module structures which can satisfy the following requirements.

(1) Cells can be easily connected and electrical resistance can be reduced.

(2) Number of parts can be reduced and the structure can be simple and light weight.

(3) Fine layout of cells can be performed and space is used effectively.

(4) Misassembly, damage, and short circuiting of cells can be avoided.

(5) Low resistance is achieved in connecting a controlling substrate and a cell, and complicated arrangement of a harness can be avoided.

The present invention has been made to achieve the above-mentioned objects. The invention provides a cell module structure comprising a bus bar plate and plural cylindrical cells; the bus bar plate including plural bus bars each having a positive bus bar terminal, a negative bus bar terminal, and a screw formed in one of the terminals, the bus bars being serially connected to each other with the positive bus bar terminal corresponding to the negative bus bar terminal; and a control substrate integrally provided to the bus bar and connected to the bus bars; the cell including a positive cell terminal and a negative cell terminal coaxially aligned at an end thereof, and a screw formed in the terminal having the same polarity as that of the bus bar terminal which is formed with the screw to which the above screw is screwed; wherein the screw of the cell is screwed to the screw of the bus bar, so that different terminals with no screw are brought into contact with each other, whereby the plural cells are serially connected.

According to the invention, the bus bars to which the cells are actually connected and the control substrate connected to the bus bars are integrally provided to the bus bar plate to which the cells are serially connected. The control substrate comprises, for example, a circuit for monitoring conditions such as voltage and temperature of the cells, and is driven by the power provided from the cells via the bus bar. When a cell module is formed, the screw formed in one of the terminals of the cell is fitted to the screw formed in one of the terminals of the bus bar in the bus bar plate, and the cell is rotated and secured. By this operation, the terminals with the screw are contacted to each other by the screw connection. By the screw action of the cell, the terminals with no screw are brought into contact with each other. By this connection, the plural cells are serially connected by each bus bar, and thus a cell module is formed.

According to the invention, the cell is screwed and secured to the bus bar, so that the positive terminal and the negative terminal of both are contacted with each other, and power is transmitted. Therefore, the contacting surface pressure between both can be sufficiently obtained, and the distance for electrical transmission can be extremely short, so that the electrical resistance can be greatly reduced. Furthermore, for the structure of screw securing, the rigidity of the connected condition of the cell and bus bar can be improved. As a result, the connected condition of the terminals can be rigidly maintained, so that the electrical resistance can be further reduced. In addition, the supporting member for the cell for reducing the load exerted on the connecting portion is not required, so that the number of parts is reduced and the structure can be simplified.

The positive terminal and the negative terminal of the cell can be serially connected to each other merely by screwing the cell to the bus bar, so that securing members such as bolts and nuts, and securing tools, are not needed. Therefore, the above operation for connecting can be performed very easily, and the space for the operation can be reduced. In addition, the space occupied by overall the cell and the cell module can be reduced, so that limited space can be utilized effectively. Moreover, the number of parts can be reduced and the structure can be simple and light weight. The connecting operation can be more easily performed since the operator need not confirm the polarity of the terminal of the cell in connecting the cell to the bus bar plate, and misassembly of the same polarity and short circuiting due to this can be avoided.

In the invention, the control substrate is integrally provided with the bus bar plate in the condition in which the control substrate is connected to the bus bar, and the power of the cells is directly provided to the control substrate via the bus bar. Therefore, the electrical resistance of the power supply line from cells to the control substrate can be easily reduced. Moreover, it is not necessary for a substrate and a harness to be arranged for each cell around a bus bar plate as in the conventional art, so that the connecting operation and the structure are not complicated.

The following are preferred features of the invention.

The bus bar may comprise a plate-shaped bus bar body, which is integrally formed with the positive bus bar terminal and the negative bus bar terminal. The bus bar integrally formed can be stronger than a divided structure, the number of parts can be reduced, and the connecting operation can be simple.

In the adjoined pair of the bus bars in the bus bar plate, the positive bus bar terminal of one of the bus bars and the negative bus bar terminal of another bus bar may be coaxially aligned holding a cylindrical insulating member therebetween, the insulating member may include a coaxially aligning member for contacting the bus bar, thereby maintaining the coaxial alignment with the bus bar. The bus bars arranged in the bus bar plate are serially connected each other corresponding the positive bus bar terminal and the negative bus bar terminal of the adjoined bus bars, and these terminals are connected to the terminals of the cells. Since the positive cell terminal and the negative cell terminal of the cell are coaxially aligned, the terminals of the bus bar need to be coaxially aligned. The coaxial alignment is maintained by a coaxially aligning member provided to the insulating member. As a result, the terminals of the cell and the terminals of the bus bar can be reliably connected.

The bus bar plate may comprise a first plate disposed at a side where the cell is mounted, and a second plate which holds the bus bar associating with the first plate, the first plate may comprise a fitting portion which supports a reaction from the bus bar plate due to a screwing torque generated when the screw of the cell is screwed to the screw of the bus bar, and may engage with the bus bar so as to prevent extraction of the bus bar. In this feature, the torque by the screwed cell is reliably generated by the fitting portion formed in the second plate, and the bus bar is not extracted.

The three cells may be arranged to form a regular triangle, which is a unit of cell arrangement. In this feature, fine layout of the cells can be obtained, and the overall cell module can be compact and the space can be effectively utilized.

The bus bar may comprise a measuring device for measuring a temperature of the cell. By measuring the temperature of the cells by the measuring device, the operating condition of the cells can be monitored, which will ensure safe operation thereof.

The bus bar plate may comprise plural ribs extending between the cells, a columnar portion may be provided at an intersection of the ribs, and the columnar portion may be provided with a measuring device for measuring temperatures of the cells around the columnar portion. The rib arranged between cells improves strength of the bus bar plate, and short circuiting between the adjoined cells due to harmful materials such as water droplets adhered to the bus bar plate can be avoided by the rib. Furthermore, in forming the bus bar plate by a resin, flowability of resin is obtained and formability thereof can be improved due to the columnar portion at the intersection of the ribs. Moreover, the temperatures of the cells around the columnar portion can be measured by installing the measuring device for temperatures of the cells in the columnar portion.

DETAILED DESCRIPTION OF THE INVENTION (1) First Embodiment

The first embodiment of the invention will be explained hereinafter with reference to FIGS. 1 to 6.

Figure 1:
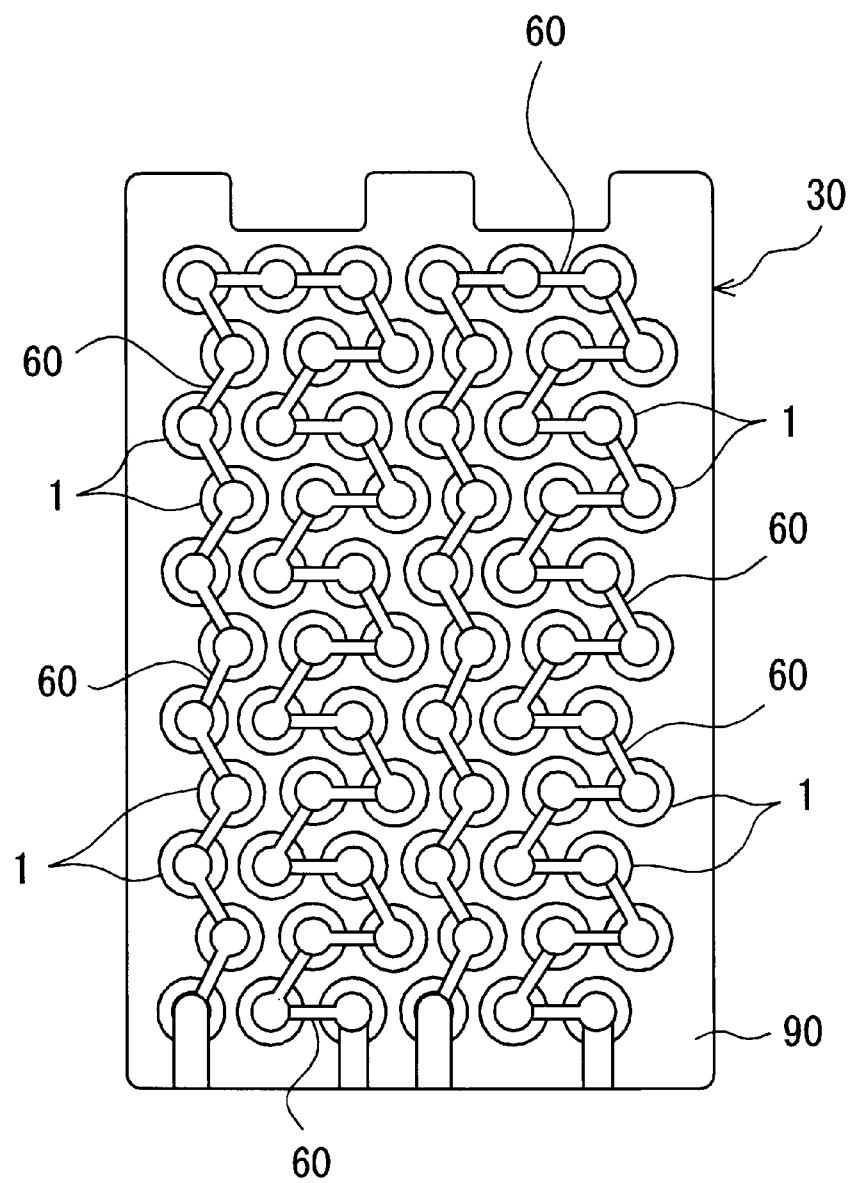
FIG. 1 is a schematic plane view of a cell module structure according to a first embodiment of the invention.
Figure 2:
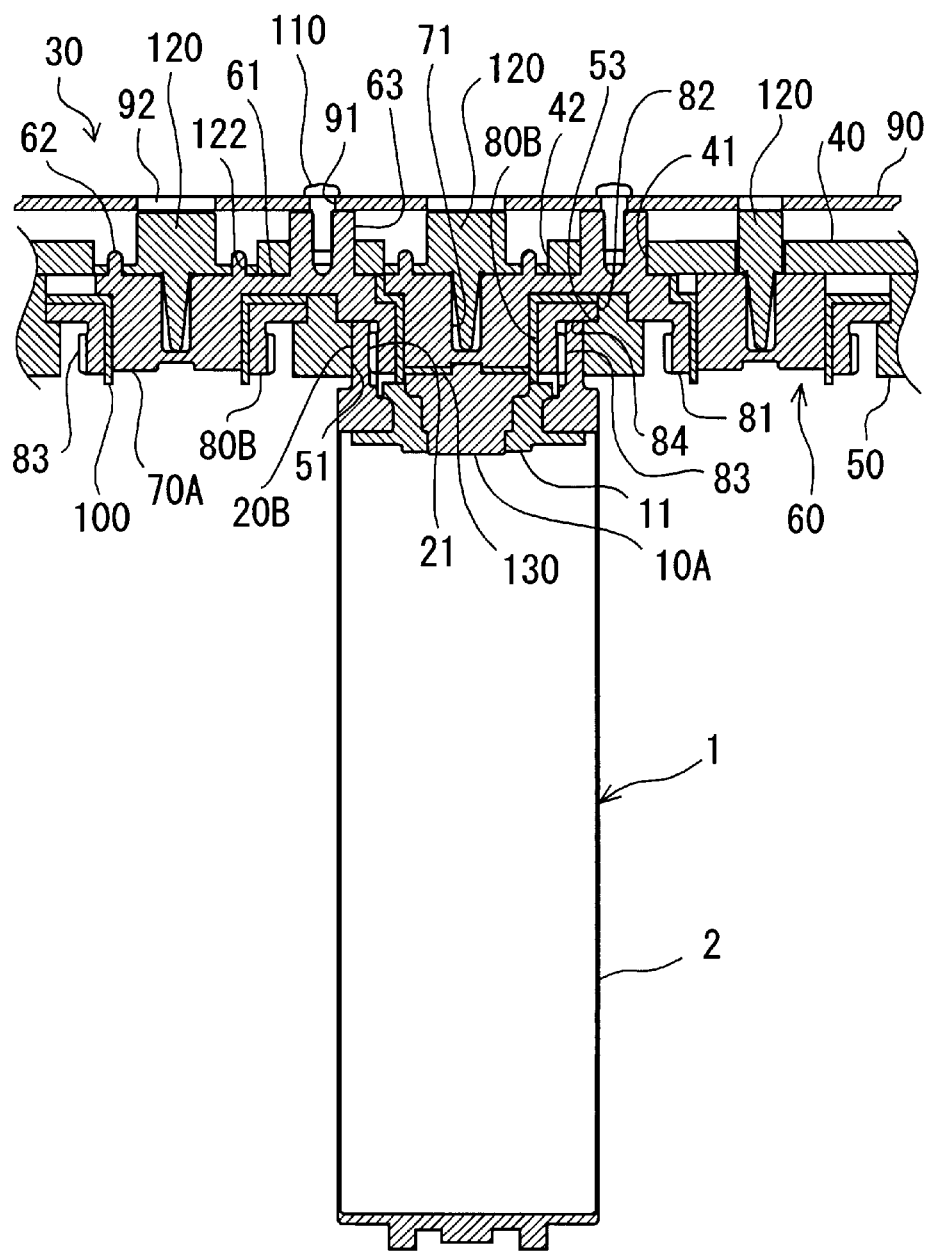
FIG. 2 is a partial vertical cross section of the cell module structure according to the first embodiment of the invention.
Figure 3:
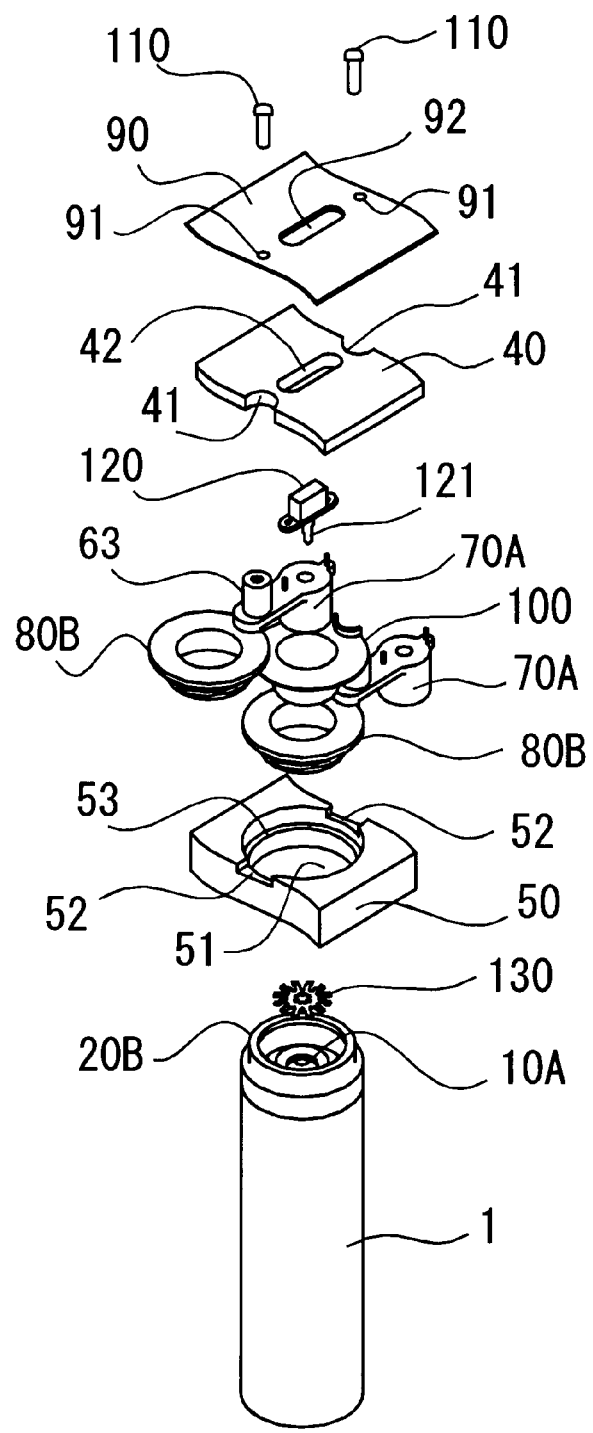
FIG. 3 is a partial exploded perspective view of the cell module structure according to the first embodiment of the invention.

FIG. 1 is a schematic plane view of a cell module structure according to the first embodiment of the invention, FIG. 2 is a vertical cross section of the structure, and FIG. 3 is an exploded perspective view showing a portion of the structure. In the FIGS., reference numeral 1 is a cell, and numeral 30 is a bus bar plate. The cell module in the embodiment is formed such that each cell 1 is connected to plural bus bars 60 equipped in the bus bar plate 30 so as to serially connect cells to each other.

First, the structure of the cell 1 will be explained with reference to FIG. 2.

The cell 1 includes a cylindrical casing 2 in which a positive terminal plate and a negative terminal plate (not shown) are installed. A positive cell terminal 10A connected to the positive terminal plate and a negative cell terminal 20B connected to the negative terminal plate are coaxially aligned with the casing 2 at an upper end thereof. The negative cell terminal 20B has a cylindrical body having relatively smaller diameter than that of the casing 2 and a female screw 21 on the inner surface thereof.

The positive cell terminal 10A is a solid column and is disposed in the inside of the negative cell terminal 20B. The height of the positive cell terminal 10A is lower than that of the negative cell terminal 20B so as to be embedded in the negative cell terminal 20B. An insulating member 11 is held by the positive cell terminal 10A and the negative cell terminal 20B.

Details of the bus bar plate 30 will be explained hereinafter.

The bus bar plate 30 is constructed such that the plural bus bar 60 are arranged between an upper plate 40 and a lower plate 50 and a control substrate 90 is disposed on the upper plate 40. The upper and lower plates 40 and 50 are made from a resin and have a rectangular shape of the same size. As shown in FIG. 3, plural fitting through holes 41 for a current collecting collar are formed at predetermined positions of the upper plate 40. An elongated thermistor mounting through hole 42 is formed between the fitting through holes 41. Plural cell mounting through holes 51 are formed at predetermined positions of the lower plate 50. A fitting groove 52 into which the bus bar 60 is fitted is formed on the upper surface of the lower plate 50, where the bus bar 60 is positioned between the cell mounting through holes 51. The upper portion of the inner diameter of the cell mounting through hole 51 is larger than that of the lower portion thereof so as to form a circular step portion 53 in the inner surface. The centers of the thermistor mounting through hole 42 of the upper plate 40 and the cell mounting through hole 51 of the lower plate 50 are coaxially aligned with the axis of the cell 1 when the plates 40 and 50 are assembled.

Figure 4:
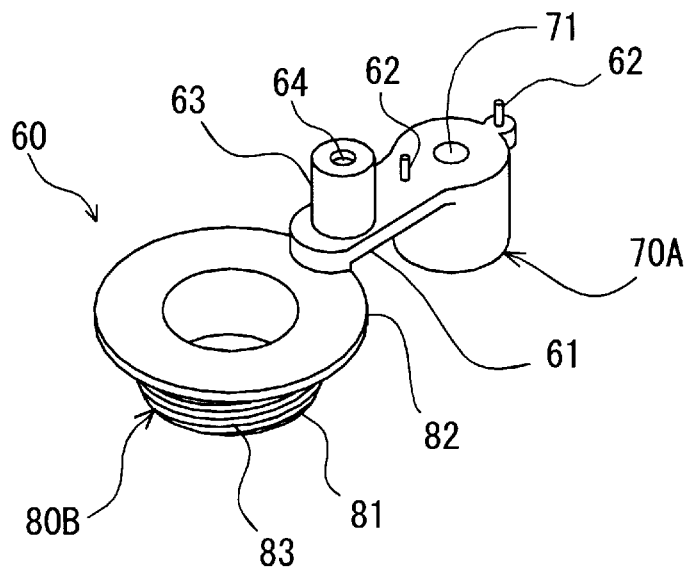
FIG. 4 is a perspective view of an integral bus bar according to the first embodiment of the invention.

As shown in FIG. 4, the bus bar 60 comprises a positive bus bar terminal 70A and negative bus bar terminal 80B, which are aligned and connected to each other by a short plate-like bus bar body 61. The positive bus bar terminal 70A is a solid column and is formed with a thermistor inserting hole 71 which opens upwardly at the center thereof. The negative bus bar terminal 80B comprises a cylindrical portion 81 and a flange 82 disposed thereon. A male screw 83 is formed on the outer surface of the cylindrical portion 81. The male screw 83 can be screwed to a female screw 21 formed in the negative cell terminal 20B. As shown in FIG. 2, the lower surface of the flange 82 serves as a seat surface 84 with which the negative cell terminal 20B of the cell 1 is brought into contact. The bus bar body 61 extends in the radial directions of the positive bus bar terminal 70A and the negative bus bar terminal 80B. The upper surface of the bus bar body 61 coincides with the upper surface of the positive bus bar terminal 70A and is connected to the upper surface of the flange 82.

As shown in FIG. 4, a pair of thermistor pins 62 and a current collecting collar 63 project from the upper surface of the bus bar body 61. The thermistor pins 62 are aligned on the center of the width of the bus bar body 61 at both sides of the thermistor inserting hole 71. The current collecting collar 63 is disposed close to the negative bus bar terminal 80B. An upwardly opening screw hole 64 is formed in the center of the current collecting collar 63. The bus bar 60 consists of the positive bus bar terminal 70A, the negative bus bar terminal 80B, the bus bar body 61, the thermistor pin 62, and the current collecting collar 63 is integrally formed from a metal with high conductivity.

The control substrate 90 has a rectangular shape of the same size as the upper and lower plates 40 and 50, and is installed with a control circuit for measuring the voltage of the cells 1 and outputs a current to an external voltage control circuit. As shown in FIGS. 2 and 3, the control substrate 90 is formed with screw inserting through holes 91 corresponding to the screw holes 64 of the current collecting collar 63 of the bus bar 60, and elongated thermistor inserting through holes 92 corresponding to the thermistor inserting through holes 42 of the upper plate 40.

Figure 5:
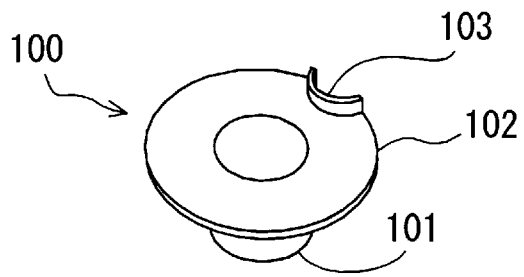
FIG. 5 is a perspective view of an insulating cap according to the first embodiment of the invention.

The plural bus bars 60 are serially aligned corresponding the positive bus bar terminal 70A and the negative bus bar terminal 80B, between which an insulating cap 100 is held. As shown in FIG. 5, the insulating cap comprises a cylindrical portion 101 and a flange 102 formed thereon. The cylindrical portion 101 is inserted into the negative bus bar terminal 80B of the bus bar 60, and the flange 102 is overlapped on the flange 82 of the negative bus bar terminal 80B. The positive bus bar terminal 70A of the bus bar 60 is fitted into the cylindrical portion 101. A semicircular notch is formed at the circumference of the flange 102. A circular piece 103 projects along the rim of the notch. The circular piece 103 is engaged with the outer surface of the current collecting collar 63 of the bus bar 60. In this condition, the cylindrical portion 101 of the insulating cap 100 and the negative bus bar terminal 80B are coaxially aligned with each other.

The plural bus bars 60 are serially aligned in the following manner.

The insulating cap 100 is mounted to the negative bus bar terminal 80B of the bus bar 60 engaging the circular piece 103 with the outer surface of the current collecting collar 63. Then, the positive bus bar terminal 70A of the bus bar 60 adjoining the above bus bar 60 is fitted into the insulating cap 100 from above. This assembly is repeated in order, and the plural bus bars 60 are serially aligned. The positive bus bar terminal 70A and the negative bus bar terminal 80B of the adjoining bus bars 60 overlap each other holding the insulating cap 100, and this portion serves as a terminal connecting portion for the cell 1. As shown in FIG. 1, the bus bars 60 are arranged to form a regular triangle, which is a unit of cell arrangement, and the cells 1 are entirely arranged zigzag in the bus bar plate 30.

Next, the bus bar plate 30 is assembled in the following manner.

Bus bars 60 are serially arranged as in the above manner, the current collecting collar 63 of each bus bar 60 is fitted into the fitting through hole 41 of the upper plate 40, and the upper plate 40 is overlapped on the bus bars 60. Then, the current collecting collars 63 of the bus bars 60 are covered with the control substrate 90. A screw 110 is inserted through the screw inserting through hole 91 of the control substrate 90 and is screwed to the screw hole 64 of the current collecting collar 63, and each bus bar 60 and the control substrate 90 are secured together. The cylindrical portion 81 of the negative bus bar terminal 80B of each bus bar 60 is fitted into the cell mounting through hole 51 of the lower plate 50, and the bus bar body 61 of each bus bar 60 is fitted into the fitting groove 52. The seat surface on the lower surface of the flange 82 of the negative bus bar terminal 80B is supported by the step portion 53 of the lower plate 50. A clearance into which the negative cell terminal 20B of the cell 1 is fitted is formed between the male screw 83 of the negative bus bar terminal 80B and the inner surface of the cell mounting through hole 51 of the lower plate 50.

Thus, the bus bar plate 30 has been assembled. A thermistor 120 for measuring the temperature of the cell 1 is mounted to each cell 1 in the bus bar plate 30. As shown in FIGS. 2 and 3, the thermistor 120 comprises a needle-shaped sharpened measuring portion 121 and a pair of positioning through holes 122 for positioning thereof by fitting with each thermistor pin 62 of the bus bar 60. The thermistor 120 is passed through the thermistor inserting through holes 92 and 42 of the control substrate 90 and the upper plate 40 facing the measuring portion 121 downward; the measuring portion 121 is inserted into the thermistor inserting hole 71 of the positive bus bar terminal 70A; the thermistor pin 62 is fitted into the positioning through hole 122; and thus the thermistor 120 is mounted to the positive bus bar terminal 70A.

Figure 6:
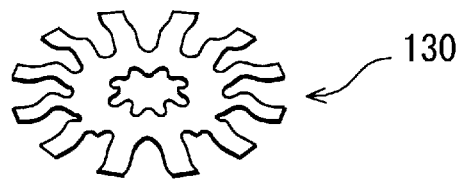
FIG. 6 is a perspective view of a conductive washer according to the first embodiment of the invention.

Each cell 1 is mounted to the bus bar plate 30 by screwing and securing the female screw 21 of the negative cell terminal 20B to the male screw 83 of the negative bus bar terminal 80B of each bus bar 60, and a cell module is thus formed. A conductive washer 130 like a conical spring shown in FIG. 6 is held and elastically deformed between the positive bus bar terminal 70A of the bus bar 60 and the positive cell terminal 10A of the cell 1. The conductive washer 130 connects the positive terminals 10A and 70A.

Next, a process for mounting the cell 1 to the bus bar plate 30 will be explained hereinafter. The end of the cell 1, which end is not provided with the positive cell terminal 10A and the negative cell terminal 20B, is held. The conductive washer 130 is held between the positive cell terminal 10A and the positive bus bar terminal 70A, and the female screw 21 of the negative cell terminal 20B is fitted to the male screw 83 of the negative bus bar terminal 80B. The cell 1 is rotated around the axis thereof in the screwing direction.

In the condition in which the positive cell terminal 10A and the positive bus bar terminal 70A are brought into contact with the conductive washer 130, a space for screwing the cell 1 remains. The cell 1 is further forced to rotate in the screwing direction, so that the conductive washer 130 is elastically crushed, and the end surface of the negative cell terminal 20B is brought into contact with the seat surface 84 of the negative bus bar terminal 80B. In this condition, the step portion 53 of the lower plate 50 engages with the seat surface 84 of the negative bus bar 60, so that the step portion 53 receives the reaction due to the torque by the screwed cell 1 from the negative bus bar terminal 80B. That is, the torque by the screwed cell 1 is reliably generated by the step portion 53 formed in the lower plate 50, and the bus bar 60 is not extracted. The above-mentioned operation for mounting is performed for each bus bar 60, and the cell module shown in FIG. 1 is obtained.

In each cell 1, the negative cell terminal 20B is connected to the negative bus bar terminal 80B of the bus bar 60 by the screw securing and contacting of the end surface. The positive cell terminal 10A is connected to the positive bus bar terminal 70A of the bus bar 60 via conductive washer 130 by the screwing of the cell 1. In this connecting condition, the positive cell terminal 10A and the negative cell terminal 20B of the plural cell 1 are serially connected to each other, and the cell module is thus formed. The power of the cells 1 is provided to the control substrate 90 via the current collecting collar 63 of the bus bar 60 and the screw 110. The thus constructed cell module is contained in a rectangular casing and is installed in, for example, automobiles.

In this embodiment, the cell 1 is screwed and secured to the terminal connecting portion of the bus bar 60 installed in the bus bar plate 30, so that the positive terminal and the negative terminal of both are contacted with each other, and power is transmitted. Therefore, the contacting surface pressure between the terminals can be sufficiently obtained, and the distance for electrical transmission can be extremely short, so that the electrical resistance can be greatly reduced. Furthermore, the screwing portion of the cell 1 with respect to the bus bar plate 30 is formed in the outer negative cell terminal 20B other than the inner positive cell terminal 10A, so that the rigidity of the connected condition can be improved. Therefore, the connected condition of the terminals can be rigidly maintained, so that the electrical resistance can be further reduced. In addition, the supporting member for the cell 1 for reducing the load exerted on the connecting portion is not required, so that the number of parts is reduced and the structure can be simplified.

The positive terminal and the negative terminal of the cell 1 can be serially connected to each other merely by screwing the cell 1 to the terminal connecting portion of the bus bar plate 30, so that securing members such as bolts and nuts, and securing tools, are not needed. As a result, the above operation for connecting can be performed very easily, and the space for the operation can be reduced. In addition, the space occupied by overall the cell 1 and the cell module can be reduced, so that limited space can be utilized effectively. Moreover, the number of parts can be reduced and the structure can be simple and light weight. The connecting operation can be more easily performed since the operator need not confirm the polarity of the terminal of the cell 1 in connecting the cell 1 to the bus bar plate 30, and misassembly of the same polarity and short circuiting due to this can be avoided.

In the embodiment, the control substrate 90 is integrally provided with the bus bar plate 30 in the condition in which the control substrate 90 is connected to the current collecting collar 63 of the bus bar 60, and the power of the cells 1 is directly provided to the control substrate 90 via the current collecting collar 63. Therefore, the electrical resistance of the power supply line from cells 1 to the control substrate 90 can be easily reduced. Moreover, it is not necessary for control substrate and a harness to be arranged for each cell around a bus bar plate as in the conventional art, so that the connecting operation and the structure are not complicated.

The bus bar 60 comprising the positive bus bar terminal 70A and the negative bus bar terminal 80B is integrally formed. Such an integrated structure can be stronger than a divided structure, the number of parts can be reduced, and the connecting operation can be simple.

The insulating cap 100 for insulating the positive bus bar terminal 70A and the negative bus bar terminal 80B at the terminal connecting portion of the bus bar 60 comprises the circular piece 103 for maintaining each terminal coaxially. Since the positive cell terminal 10A and the negative cell terminal 20B of the cell 1 are coaxially aligned, the terminals of the bus bar 60 need to be coaxially aligned. The coaxial alignment is maintained by engaging the circular piece 103 with the current collecting collar 63 integrally formed with the bus bar 60. As a result, the terminals of the cell 1 and the terminals of the bus bar 60 can be reliably connected.

In addition, since the three cells 1 are arranged to form a regular triangle, which is a unit of cell arrangement, and the cells 1 are entirely arranged zigzag, fine layout of the cells 1 can be obtained, and overall the cell module can be compact and the space can be effectively utilized.

In the embodiment, since the height of the outer negative cell terminal 20B is higher than that of the inner positive cell terminal 10A so that the cell terminal 20B projects from the cell terminal 10A, and the female screw 21 is formed in the inner surface of the negative cell terminal 20B, the positive cell terminal 10A is protected by the negative cell terminal 20B, and the female screw 21 of the negative cell terminal 20B is not exposed outward. Therefore, the end surface of the positive cell terminal 10A and the female screw 21 of the negative cell terminal 20B, which are essential for the power transmitting portion, will not be damaged, and problems, in which sufficient electrical contact is not obtained, may be solved. The short circuiting of both terminals 10A and 20B may be prevented.

Moreover, the conductive washer 130 is held between the positive cell terminal 10A of the cell 1 and the positive bus bar terminal 70A of the bus bar 60. Therefore, even if the sizes of the parts have some tolerance, the tolerance can be accommodated, and the positive and negative terminals 10A and 20B of the cell 1 and the positive and negative terminals 70A and 80B of the bus bar 60 can be reliably connected. Furthermore, decrease of the contacting surface pressure between the terminals due to creep of terminals or release of a screwed portion can be inhibited, and electrical transmission at a low electrical resistance can be maintained over a long term.

Figure 7:
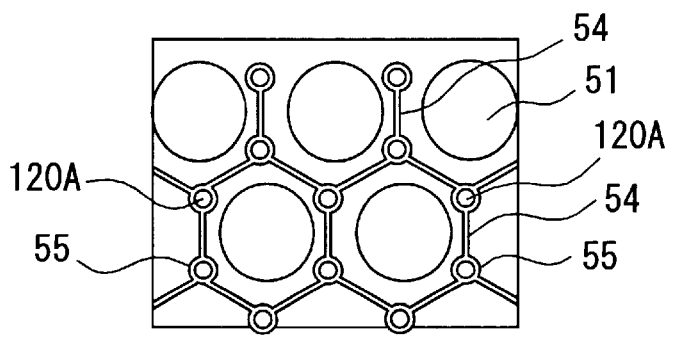
FIG. 7 is a reverse plane view of an arrangement of the lower plate according to the first embodiment of the invention.

FIG. 7 shows an arrangement of the lower plate 50 in the embodiment, in which a rib 54 is projected between the cells 1 of the lower plate 50. A columnar portion 55 is provided at the intersection of the ribs 54, and a thermistor 120A for measuring the temperature of the cell 1 is mounted to the end portion of the columnar portion 55.

The rib 54 arranged between cells 1 improves the strength of the lower plate 50, and thereby that of the entire bus bar plate 30. Short circuiting between the adjoining cells 1 due to harmful material such as water droplets adhered to the lower plate 50 can be avoided by the rib 54. In forming the lower plate 50, flowability of resin is obtained and formability thereof can be improved due to the columnar portion 55 at the intersection of the ribs 54. The temperature of the cells 1 around the columnar portion 55 may be monitored by installing the thermistor 120A in the columnar portion 55. Therefore, since the thermistor 120 need not be inserted into the positive bus bar terminal 70A of the bus bar 60 as in the above, the number of thermistors can be reduced.

(2) Second Embodiment

A second embodiment in which the bus bar is a divided structure will be explained hereinafter with reference to FIGS. 8 to 10. In these figures, the numerals corresponding to those in the first embodiment are attached to the same elements as in the first embodiment, and explanations thereof are omitted.

Figure 10:
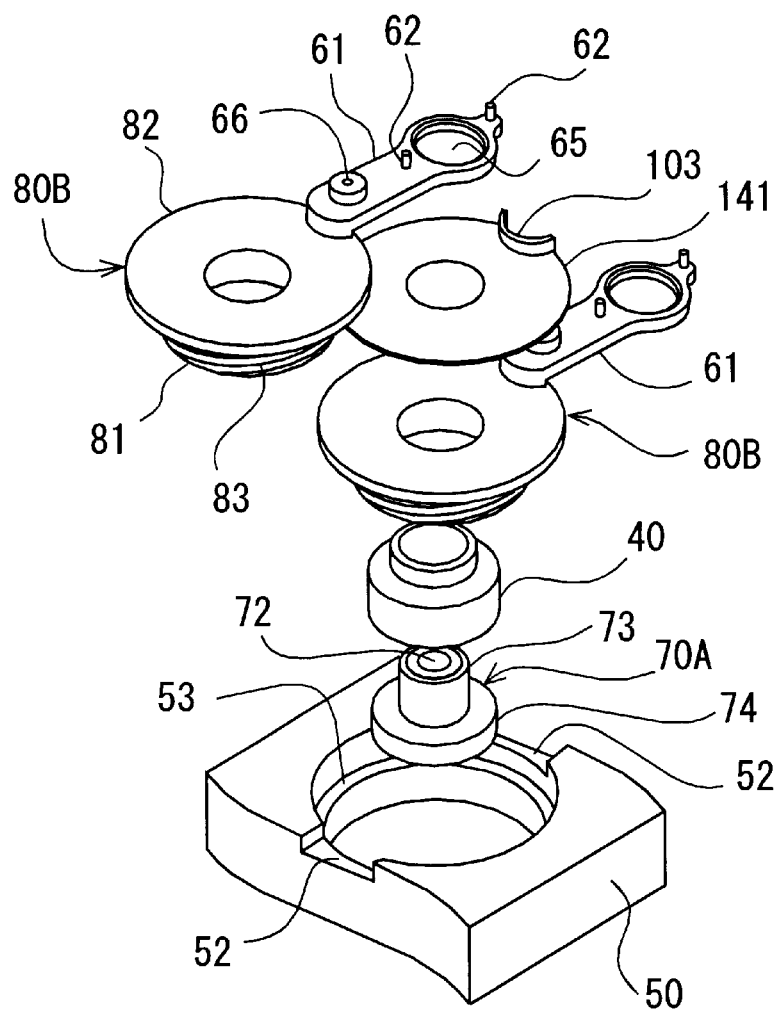
FIG. 10 is a perspective view of a divided bus bar according to the second embodiment of the invention.
Figure 11:
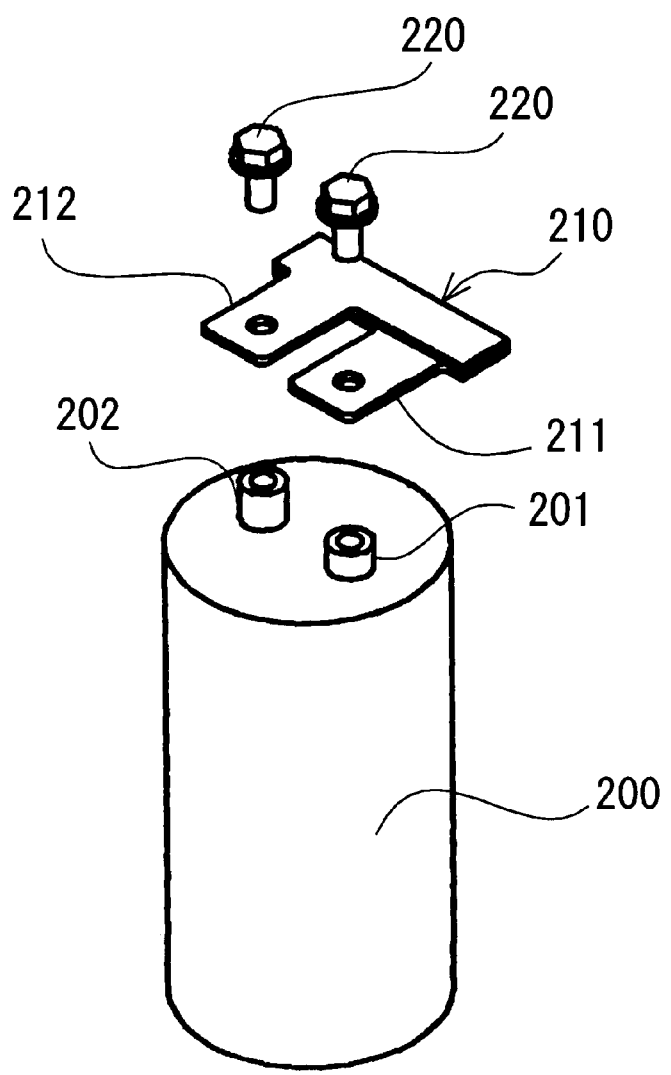
FIG. 11 is a perspective view of a conventional cell module.

As shown in FIG. 10, in the bus bar, the negative bus bar terminal 80B and the positive bus bar terminal 70A are individually formed, and a bus bar body 61 is integrally formed with the negative bus bar terminal 80B. A fitting through hole 65 for fitting with the positive bus bar terminal 70A is formed at the end portion of the bus bar body 61. A pair of thermistor pins 62 are formed around the fitting through hole 65. A mounting screw hole 66 for mounting a current collecting collar 63 is formed close to the negative bus bar terminal 80B on the upper surface of the bus bar body 61. The positive bus bar terminal 70A comprises a circular portion 73 having a thermistor inserting through hole 72 and a flange 74 formed at the lower end of the circular portion 73, and is inserted into the negative bus bar terminal 80B via an insulating cap 140 from the circular portion 73 side.

Figure 8:
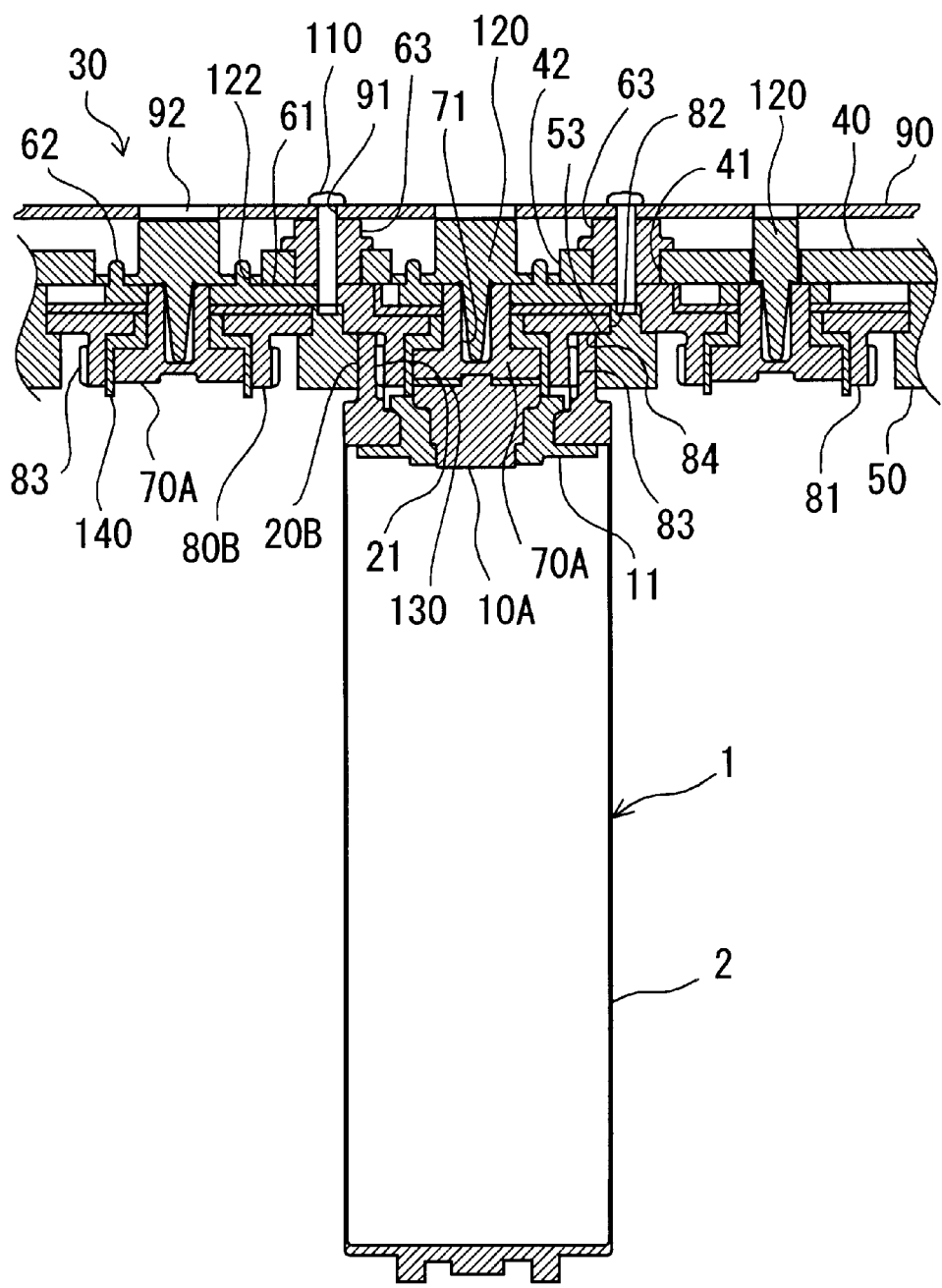
FIG. 8 is a partial vertical cross section of a cell module structure according to a second embodiment of the invention.
Figure 9:
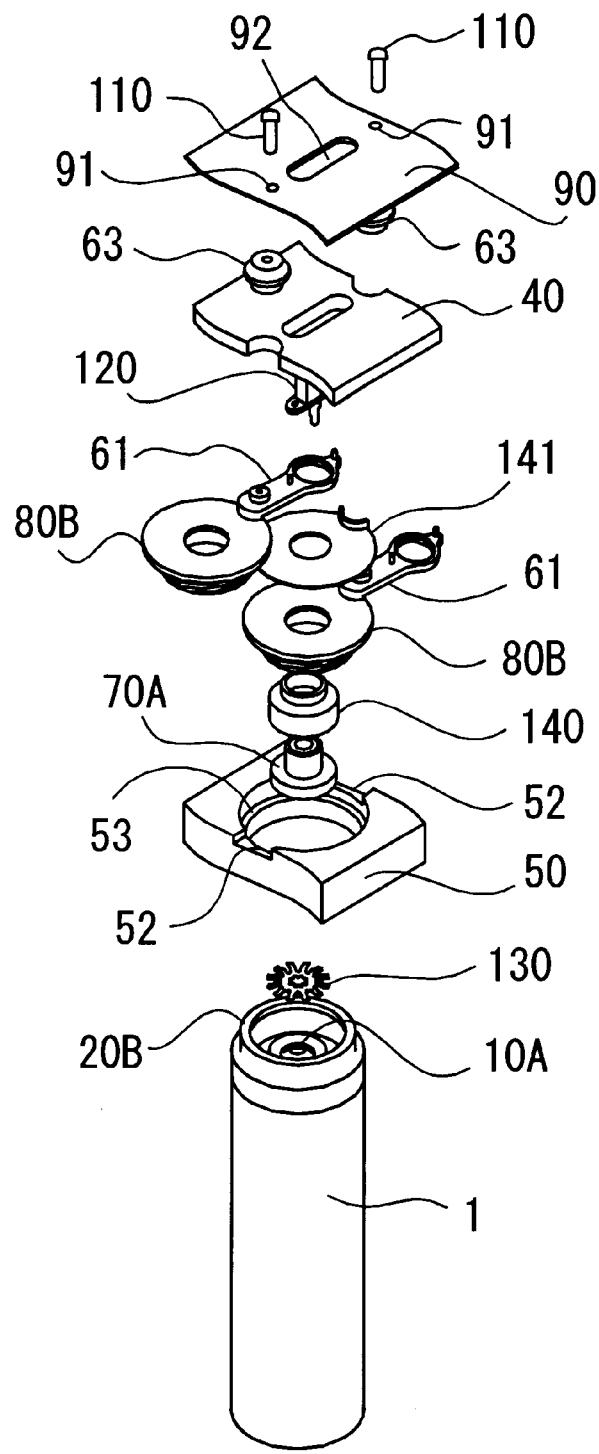
FIG. 9 is a partial exploded perspective view of the cell module structure according to the second embodiment of the invention.

As shown in FIG. 8, the current collecting collar 63 is also individually formed. In this structure, a screw 110 penetrating through a control substrate 90 and the current collecting collar 63 is screwed to the mounting screw hole 66, the control substrate 90, the current collecting collar 63, and the bus bar body 61 are secured together. As shown in FIG. 10, a ring-shaped insulating cap 141 is held between the bus bar body 61 and the negative bus bar terminal 80B. As shown in FIG. 8, the cell 1 is screwed and secured to the negative bus bar terminal 80B, so that the circular portion 73 is fitted into the insulating cap 141 and the fitting through hole 65 of the bus bar body 61, and the flange 74 is engaged with the flange 82 of the negative bus bar terminal 80B via the insulating cap 140, and the unitary positive bus bar terminal 70A is thus secured. The positive bus bar terminal 70A and the negative bus bar terminal 80B are coaxially aligned since a circular piece 103 formed in the insulating cap 141 engages with the current collecting collar 63.

In this embodiment, the reaction which is generated when the positive cell terminal 10A of the cell 1 is thrust to the positive bus bar terminal 70A of the bus bar 60 does not influence the upper plate 40 and the lower plate 50. Therefore, the step portion 53 for supporting the cell 1 can be reduced other than the case in which the bus bar 60 is integrally formed. As a result, the seat surface 84 can be large, and superior electrical transmission can be obtained.

What is claimed is:

1. A cell module structure comprising a bus bar plate and plural cylindrical cells;
the bus bar plate including plural bus bars each having a positive bus bar terminal, a negative bus bar terminal, and a screw formed in one of the terminals, the bus bars being serially connected to each other with the positive bus bar terminal of a first bus bar being electrically connectable to the negative bus bar terminal of a second bus bar; and a control substrate integrally provided to the bus bar and connected to the bus bars;
each cell including a positive cell terminal and a negative cell terminal coaxially aligned at an end thereof, and a screw formed in the terminal having the same polarity as that of the bus bar terminal which is formed with the screw to which the above screw is screwed;
wherein the screw of each cell is screwed to the screw of the bus bar, so that different terminals with no screw are brought into contact with each other, whereby the plural cells are serially connected.

2. The cell module structure according to claim 1, wherein the bus bar comprises a plate-shaped bus bar body, which is integrally formed with the positive bus bar terminal and the negative bus bar terminal.

3. The cell module structure according to claim 1, wherein in adjoined two bus bars in the bus bar plate, the positive bus bar terminal of one of the bus bars and the negative bus bar terminal of another bus bar are coaxially aligned holding a cylindrical insulating member therebetween, the insulating member includes a coaxially aligning member for contacting the bus bar thereby maintaining the coaxial alignment with the bus bar.

4. The cell module structure according to claim 1, wherein the bus bar plate comprises a first plate disposed at a side where the cell is mounted, and a second plate which holds the bus bar associating with the first plate, the first plate comprises a fitting portion which supports a reaction from the bus bar plate due to a screwing torque generated when the screw of the cell is screwed to the screw of the bus bar, and engages with the bus bar so as to prevent extraction of the bus bar.

5. The cell module structure according to claim 1, wherein three cells are arranged to form a regular triangle, which is a unit of cell arrangement.

6. The cell module structure according to claim 1, wherein the bus bar comprises a measuring device for measuring a temperature of the cell.

7. The cell module structure according to claim 1, wherein the bus bar plate comprises plural ribs extending between the cells, a columnar portion is provided at an intersection of the ribs, and the columnar portion is provided with a measuring device for measuring the temperatures of the cells around the columnar portion.

* * * * *